United States Patent Office 2,811,471
Patented Oct. 29, 1957

2,811,471

POLYTRIFLUOROCHLOROETHYLENE-COATED ALUMINUM

Henry N. Homeyer, Jr., Milford, Conn., assignor to The Connecticut Hard Rubber Company, New Haven, Conn., a corporation of Connecticut No Drawing. Application May 10, 1954,
Serial No. 428,845

5 Claims. (Cl. 148—6.2)

This invention relates to a method of forming in situ and adhering to metals a strong and remarkably impervious film of flexible, plasticized polytrifluorochloroethylene and to the products of said process. An illustrative embodiment of the invention is an aluminum alloy container for 98% nitric acid, said container having a liner of polytrifluorochloroethylene.

In the prior application of Homeyer and Moroney, Serial No. 338,136 filed February 20, 1953, now abandoned, there is a disclosure of a method of testing the permeability of films of polytrifluorochloroethylene. It has been determined that a film which is entirely impermeable to 98% nitric acid and its vapors, is substantially impermeable to most corrosive materials. It has been found that 98% nitric acid is a useful agent to employ in testing coated metals for the presence of tiny "pin holes" or pores in the film through which a corrosive agent might permeate. It has been established that in any situation involving the use of 98% nitric acid, polytrifluorochloroethylene formulations similar to those of Examples 6 to 11 of said parent application are significantly different from conventional thin films of polytetrafluoroethylene, or other materials having pores or "pin holes." Fluorinated plastics such as polytrifluorochloroethylene and polytetrafluoroethylene differ markedly from conventional organic materials affected adversely by numerous materials encountered in the chemical process industries.

Heretofore, metals have been protected from corrosive substances by coatings of conventional organic materials. Metal articles are frequently subjected to bending, vibration, flexing, and twisting. Under such conditions, some organic coatings designed as protective coatings for metal have tended to flake away from the metal or to lose a portion of their adherence or to develop permeability. Such imperfect coatings are conveniently designated as brittle coatings to distinguish them from flexible coatings. In some instances, the organic coating has had relatively little tensile strength. Those organic coatings which do have a tensile strength of the general magnitude of other macromolecular structural materials are herein designated as organic films to distinguish them from organic coatings without significant film strength. Rigid metal vessels have previously been provided with organic liners which were readily inserted or removed from the vessel and which did not have significant adherence to the vessel. Such nonadherent liners have generally been of a thickness generally greater than about .020 inch. Protective coatings which are both reasonably strong and thinner than about 0.20 inch are herein designated as thin-film coatings.

Heretofore, it has been possible to form adherent thin films of many varieties of organic plastic on metal surfaces and in the chemical process industries, tanks and other apparatus have been coated with polyvinyl plastics, polyvinylidine chloride films and other mechanically strong thin films firmly bonded to the metal.

The fluorinated plastics, such as polytetrafluoroethylene, polytrifluorochloroethylene, and copolymers thereof are characterized by a high degree of nonadherence to many dissimilar materials and are particularly nonadherent to metal surfaces.

It is an object of the present invention to provide a protective coating for metals which is structurally strong, very thin, extremely impermeable to all corrosive agents, quite flexible, and sufficiently adherent to the metal to withstand the flexing, denting, and other distortions of the metal without any break in the bond between the film and the metal. Inasmuch as trifluorochloroethylene is so extremely resistant to a great variety of chemical agents, articles fabricated entirely of solid trifluorochloroethylene have been utilized for about a decade in the chemical process industries. However, because it is so expensive and because of the fact that the polytrifluorochloroethylene in fabricated shapes sells for as much as several hundred times the price of comparable metal items, it has not been used as extensively as might be expected from its unusual chemical resistance. By reason of the many decades of successful performance of thin films of adherent organic coatings on metal for purposes within the scope of chemical resistance of the organic coatings, numerous efforts have been made to provide polytrifluorochloroethylene coatings on metals. It is an object of the present invention to provide a thin, very adherent, flexible, impermeable film of polytrifluorochloroethylene on a metal surface. From the time of the first development of any polytrifluorochloroethylene, it has been recognized that the biggest potential market for the material was as a protective coating for metal, as established by the sales records for other macromolecular organic structural materials having remarkable chemical resistance. Notwithstanding this long-standing demand for an adherent, thin, impervious, flexible film of polytrifluorochloroethylene on metal, no such product was heretofore developed.

There have been proposals for extremely thick coatings of polytrifluorochloroethylene which have been objectionable due to their thermal expansion properties, resistance to heat transfer, nonadherence, high cost and related disadvantages. There have been proposals for somewhat adherent mixtures comprising organic adhesives and polytrifluorochloroethylene, which mixtures have been permeable to some corrosive agents, thereby defeating the advantages of using a material as expensive as polytrifluorochloroethylene. For example, heterogeneous mixtures of alkyd varnish and dispersions of polytrifluorochloroethylene adhere to metal but provide a coating which is as weak as its least resistant component and permeable to corrosive agents such as 98% nitric acid.

Because polytetrafluoroethylene and polytrifluorochloroethylene are each extremely nonadherent to metal, an effort was made to modify a prior art teaching relating to the use of a coating composition comprising a mixture of chromic acid and an aqueous suspension of polytetrafluoroethylene. After modifying the prior art teaching in order to form a coating composition consisting essentially of a mixture of chromic acid and an aqueous dispersion of polytrifluorochloroethylene, the coating composition was deposited on aluminum. Although some organic material was deposited on the metal, a significant amount of chromic acid was coprecipitated with the fluorinated plastic material, and the combination provided no significant resistance to corrosive agents. However, by the present invention, a thin, flexible, impermeable film of polytrifluorochloroethylene is securely adhered to a metallic surface.

The thin film of adherent polytrifluorochloroethylene may be formed advantageously on almost any structural metal such as steel, magnesium, zinc, copper, titanium, molybdenum, manganese, nickel, or lead. In certain preferred embodiments of the present invention, particular advantages are attained by forming the thin adherent film of polytrifluorochloroethylene on aluminum and/or aluminum alloys.

Pure aluminum is reasonably resistant to 98% nitric acid and at 160° F. is corroded at a rate of about 0.035 inch per year. Even this small amount of corrosion is troublesome by reason of the formation of a suspendible sludge. The nitric acid containing the suspendible sludge is not suitable for pumping through small tubes or orifices. Nitric acid stored in the polytrifluorochloroethylene-lined vessels of the present invention is free from the troublesome, suspendible sludge. The reference to 98% nitric acid is pertinent particularly because of the usefulness of this reagent in testing for the presence of "pin holes" in organic films. Any film proving to be impermeable to 98% nitric acid is likely to be impermeable to other solutions tending to corrode metals.

The usefulness of aluminum in the chemical process industries is limited essentially to those situations in which the aluminum structural material will not encounter any solution outside the range of pH 4–9. Accordingly, it is not feasible to utilize aluminum as a structural material if alkaline cleaners such as trisodiumphosphate are to be employed. Similarly, aluminum cannot be utilized for contacting alcoholic potassium hydroxide solutions. Aluminum is readily attacked by dilute solutions of some strong acids. Weak acids such as acetic acid, and even dilute solutions thereof such as vinegar, are capable of corroding aluminum. Because aluminum alloys are particularly sensitive to many of the corrosive agents, it has sometimes been necessary to provide a sheathing of pure aluminum over the aluminum alloy.

In certain embodiments of the present invention, a part of the goal is to provide sheet aluminum having a thin film of polytrifluorochloroethylene whereby the aluminum sheet can resist solutions within a pH range of from 1 to 14, and withstand substantially all of the chemical reagents ordinarily encounteerd in the chemical process industries, and generally to resist those materials which do not significantly affect polytrifluorochloroethylene. It is an object to provide this polytrifluorochloroethylene-coated aluminum with such a high degree of adhesion to the aluminum that the aluminum sheet can be twisted and flexed without adversely affecting the adherence of the thin film to the metal. It is an object to provide a thin adherent film of polytrifluorochloroethylene on aluminum characterized by sufficient flexibility that thereafter the aluminum can be stamped into suitable shape without impairing the effectiveness of the thin film of polytrifluorochloroethylene. It is also an object of the invention to provide aluminum protected by a thin film of adherent polytrifluorochloroethylene for use in articles such as pipes, ducts, hoods, filter-presses, plating equipment, autoclaves, reactors, distillation columns, condensers, heat exchangers, building frames, girders, and other structural pieces, and any other metal article subject to corrosive conditions which do not affect polytrifluorochloroethylene. It is noted that polytrifluorochloroethylene is also quite resistant to sunlight, rain, and the other adverse influences of weathering, and the polytrifluoroethylene-coated metal articles are suitable for installations in which a protective coating having prolonged weathering resistance is desired.

In accordance with the present invention, a metal is subjected to a preliminary priming treatment, rinsed, and thereafter coated with a dispersion of wax-plasticized polytrifluorochloroethylene, said coating heated for a considerable time and then quenched to form an impervious film securely bonded to the modified surface. The preparation of resinous-type polymers of polytrifluorochloroethylene and plasticizing of these resinous-type polymers with normally waxy polymers of polytrifluorochloroethylene is described in detail in Patent 2,686,767 of Irving Green, assigned to the M. W. Kellogg Company. As described in said patent, beginning in column 2, the resinous type polymers produced from the single monomer trifluorochloroethylene may be prepared by polymerizing the monomer in the presence of a suitable organic peroxide such as bistrichloracetyl peroxide, as the polymerizing agent, at a temperature between about —20 and about 25° C., preferably at a temperature of about —16° C. At a temperature of —16° C. the polymerization of trifluorochloroethylene to a satisfactory yield of solid polymer is accomplished in about seven days. At elevated temperatures and at corresponding superatmospheric pressures less time is required to complete the polymerization. As this invention does not reside in the preparation of the polymer per se, further discussion thereof is deemed unnecessary.

To distinguish the resinous polymer over the oils and waxes produced with the same monomer, the polymer is described by reference to its no strength temperature. A no strength temperature (N. S. T.) of between about 210° C. and about 350° C. is characteristic of a normally solid polymer of the above preparation having plastic characteristics. Best plastic characteristics of the normally solid polymer are observed at N. S. T. values between about 240° C. and about 340° C. The N. S. T. values of the polymer depend upon such factors as temperature, residence time, concentration of promoter, pressure, etc.

The Green patent also describes the preparation of a resinous polymer of trifluorochloroethylene plasticized with a waxy polymer of the same material. As described in Example V of the patent, a waxy polymer of trifluorochloroethylene, M. P. 40° C., to be used as a plasticizer was heated to 150° C. and the molten wax dissolved in a minimum of acetone. To the wax solution cooled to room temperature was added water which precipitated the wax forming a suspension of fine wax particles. The suspension was allowed to settle and concentrated by decanting the maximum possible amount of supernatant liquid. The resulting wax suspension had a wax content of about 25 weight percent. The amount of wax suspension required to prepare a dispersion containing 25 weight percent wax based on resin was added to a dispersion prepared as in Example I. The resulting dispersion was a satisfactory aqueous dispersion containing about 20 weight percent resin. In applying this film to aluminum, the priming solution is a hot solution containing both chromic acid and sulfuric acid.

Procedures employed in conducting control experiments and methods for practicing various embodiments of the invention are described in the examples.

*Example 1*

A clean aluminum kettle was treated to impart a modified internal surface by filling with a solution having proportions as follows:

| | |
|---|---|
| Sodium chromate | kg  1 |
| 98% sulfuric acid | kg  10 |
| Water | kg  30 |

The solution and kettle were heated at 150–160° F. for about ten minutes, during which a very small amount of aluminum was etched away, and during which the surface modification was accomplished.

The chromate solution was removed from the kettle, which was then filled several times with rinse water. The aluminum kettle, although it appeared very slightly etched, did not have chromate discoloration. The chromate-modified kettle, after rinsing, was desirably, but not necessarily, dried at a temperature below 220° F.

The aluminum kettle was then filled and emptied with liquid dispersion containing a large amount of a finely divided high-molecular-weight polytrifluorochloroethylene and a somewhat smaller amount of a wax-type of polytrifluorochloroethylene of medium molecular weight. The dispersion was characterized by the absence of conventional plasticizers, polytrifluorochloroethylene materials of a low-molecular-weight range, and polytrifluorochloroethylene materials which are liquid at room temperature, as disclosed in said Examples 6–11 of said parent application. Good results were obtained using dispersions of such polytrifluorochloroethylene in xylene, but other organic or aqueous dispersing liquids are suitable. A thin film of the polytrifluorochloroethylene was thus deposited from the dispersion onto the inside of the aluminum kettle. It was then subjected to infrared heat for about ten minutes to bring about some coalescence of the polytrifluorochloroethylene particles. Thereafter, a second and subsequent coatings of the polytrifluorochloroethylene were deposited on the inside of the aluminum kettle until the film thickness was approximately 0.008 inch. The kettle was then heated for 16 hours at about 480° F. to fuse the film into an impervious polytrifluorochloroethylene layer firmly bonded to the aluminum. The kettle was quickly cooled from about 460° F. to room temperature by quenching in water. As explained in the parent application, impervious thin films are best produced by thus carefully controlling the filming, heating and quenching steps.

The kettle was filled with 98% nitric acid, heated to 165° F. and maintained at that temperature for a period of 96 hours. The polytrifluorochloroethylene film was so completely impermeable to the nitric acid that there was no trace of any penetration of the acid. Furthermore, there was no trace of corrosion or other damage either to the aluminum kettle or to the polytrifluorochloroethylene film thereon.

*Example 2*

A sheet of aluminum is dipped in caustic solution to provide a preliminary etch and is rinsed with water. It is then immersed for about fifteen minutes in an aqueous solution containing a concentration of approximately 3.3 molal sulfuric acid and approximately 0.13 molal sodium dichromate. The aluminum panel is then rinsed with water, dried, and immersed in a dispersion of finely divided solid polytrifluorochloroethylene of which about 62% is of structural solid type and 37% is wax having a softening point of about 250° F. After heating the panel for about ten minutes to volatilize the liquid-dispersing media, the panel is again immersed in the dispersion, and the process repeated about five times. The panel is heated to a temperature of approximately 490° F. in an oven for from about 1 to 24 hours and then quenched by plunging in water. The panel has excellent corrosion resistance to all fluids which do not adversely affect polytrifluorochloroethylene. The film strength is of the magnitude of 16 pounds per inch. The adhesion is approximately 10 pounds per inch. The flexibility of the film combined with the remarkable adhesion makes the process suitable for the production of film-protected aluminum foil.

*Example 3*

A mixture of xylene, ethyl benzene, toluene and a polytrifluorochloroethylene wax (200° F. softening point) are subjected to the action of a Waring blender to convert the solid wax into finely divided particles, and to form a dispersion of such wax particles in the mixed aromatic hydrocarbon solvent. This dispersion of solid plasticizer is mixed with a conventional dispersion of high-molecular-weight polytrifluorochloroethylene in xylene to provide a ratio of approximately three parts by weight of the high-molecular-weight material to one part of polytrifluorochloroethylene wax. The mixture contains about 34% solids, and is predominantly dispersing media, such as xylene.

The wax-plasticized polytrifluorochloroethylene dispersion is sprayed with a conventional spray gun onto an irregularly shaped article stamped from an aluminum-clad aluminum alloy previously subjected for ten minutes to the chromic-sulfuric mixed acid solution of Example 1. The air blast of the spray gun volatilizes away some of the xylene rapidly, making possible a coating about 0.006 inch by a single spray treatment. Any attempt to spray a coating several times this thickness is likely to result in a cracking of the film during the drying and fusion thereof. After baking the coated article at a temperature within the range from about 450° F. to 510° F. for a few hours, and quenching, the article is protected by a film quite impervious to 98% nitric acid. Twisting and flexing of the aluminum does not rupture the firm bond between the chromate modified aluminum and the polytrifluorochloroethylene film.

Some aluminum alloys are etched more rapidly by the hot mixed acids than are the aluminum clad materials, so that the hot acid treatment is conducted for several seconds instead of ten or fifteen minutes when modifying the surface of such reactive alloys.

If desired, the molal concentration of the chromate salt may be within the range of from about 0.05 to about 0.2 instead of the 0.13, and the sulfuric acid molal concentration may be within the range from about 1.0 to about 4.0 instead of about 3.3. The temperature of the solution, although desirably about 150–160° F., may be within the range from about 130–180° F.

*Example 4*

A pressed steel container is treated with a saturated solution of zinc dihydrogen phosphate to form a phosphatized surface on the steel. The metal article, after being thus given a very careful and very thorough inorganic modification of its surface, is protected with a thin, impervious, adherent film of polytrifluorochloroethylene following the procedure of Example 3.

*Example 5*

An aluminum kettle was treated in a manner similar to that set forth in Example 1 but with the following solution:

| | |
|---|---|
| Molybdenum trioxide | kg__ 1 |
| 98% sulfuric acid | kg__ 10 |
| Water | kg__ 30 |

The resulting adhesion of the film to the aluminum base was excellent.

Various modifications of the invention are possible without departing from the scope of the appended claims.

The invention claimed is:

1. The method which includes the steps of treating an aluminum surface with an aqueous solution containing sulfuric and chromic acids, applying a mixture of high molecular weight solid polytrifluorochloroethylene and a significant amount of waxy polytrifluorochloroethylene plasticizer, heating and quenching, thereby forming a securely adhered film of polytrifluorochloroethylene on the aluminum.

2. The process which includes the steps of cleaning an aluminum surface, treating the surface with an aqueous solution having about 0.05 to about 0.2 molal chromic acid and about 1 to 4 molal sulfuric acid, rinsing excess acid from the metal surface, depositing several layers of polytrifluorochloroethylene onto the chromate modified metal surface from a dispersion of wax-plasticized polytrifluorochloroethylene, subjecting the metal to a temperature of from about 450° to 510° F. for 1 to 30 hours to transform the trifluorochloroethylene into a uniform film, and rapidly cooling the film-protected aluminum.

3. The process of forming an adherent film of trifluorochloroethylene on aluminum which includes the steps of cleaning the aluminum, subjecting the aluminum to an aqueous solution containing about 3.3 molal sulfuric acid and about 0.13 molal chromic acid, thereafter rinsing excess chromic acid from the aluminum, thereafter depositing discrete particles of both high-molecular-weight and waxy polytrifluorochloroethylene on the aluminum, thereafter heating the trifluorochloroethylene at from about 450° to 510° F. to coalesce the particles into a uniform film adherent to the chromate modified aluminum surface, and quenching the polytrifluorochloroethylene film.

4. An aluminum body having a chromate modified surface produced by reaction of the aluminum with chromic acid in the presence of sulfuric acid and an adherent overlying film of polytrifluorochloroethylene.

5. An aluminum body having a chromate modified surface produced by reaction of the aluminum with chromic acid in the presence of sulfuric acid and an adherent overlying film of plasticized polytrifluorochloroethylene.

References Cited in the file of this patent

UNITED STATES PATENTS

| | | |
|---|---|---|
| 2,137,988 | Hempel | Nov. 22, 1938 |
| 2,484,484 | Berry | Oct. 11, 1949 |
| 2,535,794 | Hempel | Dec. 26, 1950 |
| 2,562,117 | Osdal | July 24, 1951 |
| 2,562,119 | Haon | July 24, 1951 |
| 2,578,400 | Cohn | Dec. 11, 1951 |
| 2,662,034 | Mason et al. | Dec. 8, 1953 |
| 2,686,767 | Green | Aug. 17, 1954 |